United States Patent Office 3,796,748
Patented Mar. 12, 1974

3,796,748
DEHYDROABIETYLAMMONIUM D-(—)-2-CHLORO-ACETYLAMINO - 2 - (p - HYDROXYPHENYL)-ACETATE
Charles Truman Holdrege, Camillus, N.Y., assignor to Bristol-Myers Company, New York, N.Y.
No Drawing. Filed Aug. 16, 1972, Ser. No. 281,096
Int. Cl. C07c 101/72
U.S. Cl. 260—501.11  2 Claims

ABSTRACT OF THE DISCLOSURE

Racemic 2-(p-hydroxyphenyl)glycine is efficiently resolved by N-chloroacetylation followed by the addition of about 0.5 equivalents of dehydroabietylamine (DHA) in isopropanol: water (2:1 v/v) to precipitate the substantially pure, crystalline DHA salt of D-(—)-N-chloroacetyl-2-(p-hydroxyphenyl)-glycine from which the amine is removed by extraction into methylene chloride at pH 10.7 followed by removal of the N-chloroacetyl group by hot acid hydrolysis to produce the desired D-(—)-2-(p-hydroxyphenyl)glycine.

BACKGROUND OF THE INVENTION

Field of the invention

This invention relates to the use of a particular, optically active amine to resolve a racemic amino acid which is later used as the side-chain in semi-synthetic penicillins and cephalosporins.

Description of the prior art 2-(p-hydroxyphenyl)glycine, which can also be named 2 - (4-hydroxyphenyl)glycine, α-amino-p-hydroxyphenylacetic acid or C-(p-hydroxyphenyl)glycine, has been prepared in racemic form by numerous workers; cf. F. F. Blicke, Org. Reactions 1, 303–343 (1942) and B. Reichert, "Die Mannich Reaction," 1959 and Aloy et al., Chem Abst. 5, 3557 (1911) and 4, 2447 (1910).

Its D(—) or levo-rotatory isomer has been of particular interest for coupling (after appropriate protection of the free amino group) with 6-aminopenicillanic acid (6-APA) to produce a penicillin as in U.S. 3,674,776 and U.K. 1,241,844 [and see A. A. W. Long et al., J. Chem. Soc. (c) 1971 pages 1920–1922] wherein the racemic N-benzyloxycarbonyl derivative was resolved with quinine and isolated as the ephedrine salt and for coupling with 7-aminocephalosporanic acid (7-ACA) and 7-aminodesacetoxy-cephalosporanic (7-ADCA) to produce cephalosporin derivatives as in U.S. 3,489,752 wherein racemic 2 - (p-methoxyphenyl) - N - (chloroacetyl)glycine was treated with hog kidney acylase to remove preferentially the N-chloroacetyl group to produce amphoteric L-(+)-2-(p-methoxyphenyl)glycine and leave untouched the easily separated, acidic D-(—)-2-(p-methoxyphenyl)-N-(chloroacetyl)-glycine.

In addition, D-(—)-2-(p-hydroxyphenyl)glycine has been chlorinated (as in U.S. 3,489,746) to produce D-(—)-2-(3-chloro-4-hydroxyphenyl) - glycine which was converted in similar fashion to the corresponding penicillin and cephalosporins of U.S. 3,489,746 and 3,489,751.

Recently Sterwin's German Offenlegungsschrift 2,134,-251 [Chem. Abstracts 76, 113526p (1972)] has described a convenient synthesis of racemic 2-(p-hydroxyphenyl) glycine; it contains no specific information at all on resolution other than the general statement that this racemate can be resolved by the use of bases such as cinchonine, quinine, strychnine or brucine or acids such as tartaric acid, malic acid or camphorsulfonic acid. Only the racemic acid and its O,N-diacetyl derivative are described in Beecham's Belgium 774,029 (Farmdoc 27122T).

D-(—)-2-(p-hydroxyphenyl)glycine was obtained by hydrolysis of actinoidin and then by synthesis; see Chemical Abstracts, 62, 4105a and 4242g (1965), 64, 8524c (1966), 69, 87436t (1968) and 71, 3630g (1969) and the original references cited therein. See also Neims et al., Biochemistry, 5(1), 203–213 (1966) [C.A. 64, 6968h (1966)]. It was studied by Suzuki et al., C.A. 70, 43516k (1969).

Dehydroabietylamine is a well-known, optically active constituent of rosin described, for example, in U.S. 2,-787,637, which also describes various of its salts and a method for its purification via the crystallization of its acetate from toluene. It has been used to resolve various organic carboxylic acids such as phenoxyacetic acid, α-aminophenylacetic acid as the N-carbobenzyloxy derivative and α-aminothiophene-2- and 3-acetic acids as their N-formyl derivatives; see U.S. 3,454,626 and Gottstein et al., J. Org. Chem. 30, 2072 (1965) and Sjoberg et al., Arkiv. Kemi. 22, 447–450 (1964).

SUMMARY OF THE INVENTION

This invention provides as substantially chemical and optically pure, crystalline solids the compounds dehydroabietylammonium D - (—)-2-chloroacetylamino-2-(p - hydroxyphenyl)-acetate and D-(—)-2-chloroacetylamino-2-(p-hydroxyphenyl)acetic acid.

There is also provided, according to the present invention, the process for the production of dehydroabietylammonium D - (—)-2-chloroacetylamino-2-(p-hydroxyphenyl)-acetate from racemic 2 - chloroacetylamino-2-(p-hydroxyphenyl) acetic acid [also called racemic N-chloroacetyl-2 - (p-hydroxyphenyl) - glycine] which comprises mixing the latter with dehydroabietylamine or its acetate in an amount of at least 0.5 mole (and preferably about 0.5 mole), but not more than one mole of the amine per mole of the amino-acid in an aqueous lower alcohol and preferably in aqueous isopropyl alcohol, said aqueous isopropyl alcohol comprising from one to two volumes of isopropyl alchool per volume of water and being preferably abut the minimum volume needed to effect solution upon warming the mixture, with sufficient application of heat to form a solution which is then cooled slowly to precipitate substantially pure, crystalline dehydroabietylammonium D-(—) - 2-chloroacetylamino-2-(p-hydroxyphenyl)-acetate.

There is also provided, according to the present invention, the process for the production of D-2-amino-(p-hydroxyphenyl)acetic acid from dehydroabietylammonium D-(—)-2-chloroacetylamino-2-(p - hydroxyphenyl) - acetate which comprises treating the latter with a strong base, e.g. sodium hydroxide, in aqueous media and then removing the free base dehydroabietylamine by solvent extraction to leave an aqueous solution from which solid D-N-chloroacetyl-2-(p-hydroxyphenylglycine precipitates and is then recovered and heated, e.g. to reflux for several hours, in a strong acid, e.g., 2 N HCl, to obtain the corresponding acid addition salt of D-2-amino-2-(p-hydroxyphenyl)acetic acid, e.g., its hydrochloride, which is then converted to the zwitterion of D-(—)-2-amino-2-(p-hydroxyphenyl)acetic acid by treatment with alkali, e.g. aqueous sodium hydroxide.

The difficulties encountered in discovering an inexpensive, efficient method for resolving racemic 2-(p-hydroxyphenyl)glycine are illustrated by the fact that no success was achieved by applying the procedure of the example below to racemic N-formyl-2-(p-hydroxyphenyl) glycine in aqueous isopropanol (1:1), in 100% isopropanol, in aqueous methanol (1:1) or in 100% methanol.

The invention is illustrated by the following example but it is to be understood that this example is given by way of illustration and not of limitation. All temperatures are given in degrees centigrade. Dehydroabietylamine acetate is represented as DHA.AcOH and isopropyl alcohol as i-PrOH. DL indicates a racemic acid and D a resolved acid of the dextro series (which in fact in this case is levo-rotatory and can thus be named as the D-(—)-acid).

DESCRIPTION OF THE PREFERRED EMBODIMENT

Example

Preparation of D-2-(p-hydroxyphenyl)glycine

Equations

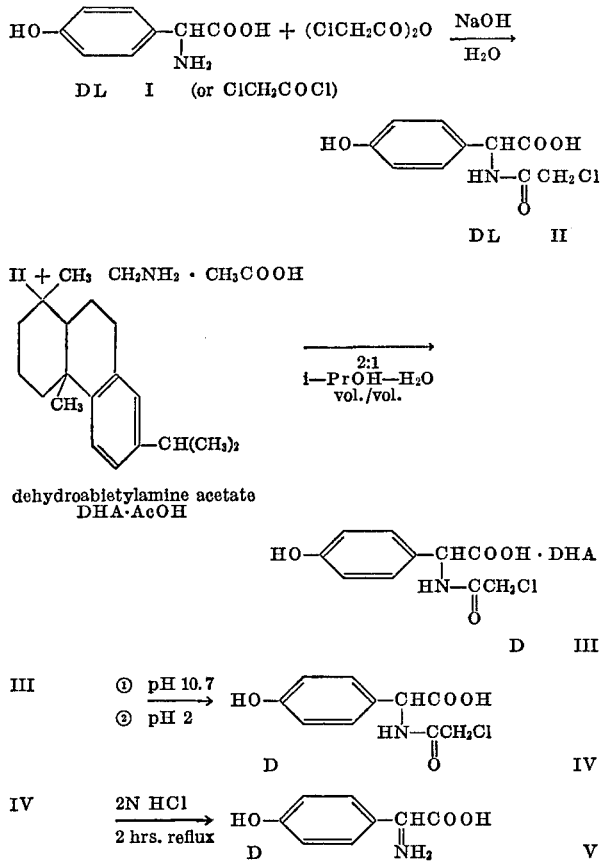

DL-N-chloroacetyl-2-(p-hydroxyphenyl)glycine (II)

A solution of 12.0 g. (0.3 mole) of sodium hydroxide in 30 ml. of water was added to a suspension of 50.2 g. (0.3 mole) of DL-2-(p-hydroxyphenyl)glycine (I) in 510 ml. of water giving about pH 10 and causing much of the amino acid to dissolve. The mixture was cooled to 5°. The cooling bath was removed and about one-half of the total amount of 102.5 g. (0.6 mole) of chloroacetic anhydride was added all at once followed by aqueous sodium hydroxide (36 g. of sodium hydroxide in 150 ml. of water) as needed to maintain the system at about pH 10. The remainder of the chloroacetic anhydride was added again followed by sodium hydroxide as needed. After about 15 min. the solution was adjusted to pH 8 (HCl), cooled and polish filtered. The filtrate was cooled in an ice bath and adjusted to pH 2 with conc. HCl. Scratching induced the slow crystallization of the product. After stirring for 2.5 hrs. in an ice bath the crop of crystalline product II was collected by filtration. A second crop of product separated from the filtrate overnight. The two crops of product (II) were combined, recrystallized from 500 ml. of water, air dried and then dried in vacuo over phosphorus pentoxide; 38.6 g. (53.0%), M.P. 183–185° dec. Analysis.—Found (percent): C, 48.50, 48.95; H, 4.19, 4.24; N, 5.58, 5.24; $H_2O$, 1.08. Found values corrected for 1.08% $H_2O$ (percent): C, 49.03, 49.48; H, 4.07, 4.12; N, 5.64, 5.29. Calcd. for $C_{10}H_{10}ClNO_4$ (percent): C, 49.29; H, 4.14; N, 5.75. The IR and NMR spectra were fully consistent for the desired compound.

Resolution of N-chloroacetyl-2-(p-hydroxyphenyl) glycine with dehydroabietylamine (A) Salt of D-N-chloroacetyl-2-(p-hydroxyphenyl) glycine with dehydroabietylamine (III).—A mixture of 5.0 g. (0.0205 mole) of racemic N-chloroacetyl-2-(p-hydroxyphenyl)glycine (II), 3.52 g. (0.01025 mole) of dehydroabietylamine acetate, 240 ml. of 2-propanol and 170 ml. of water was heated on the steam bath giving a solution. The hot solution was filtered and the filtrate was stored in an insulated container to cool slowly. Crystallization was allowed to proceed for 16 hrs. giving long needle-like crystals. The crystals of III were collected by filtration, washed sparingly with 2:1 2-propanol-water and dried at 40°; 2.6 g. (48%), M.P. 206—212°.

The filtrate containing L-N-chloroacetyl-2-(p-hydroxyphenyl)glycine is preserved; heating it at alkaline pH, e.g., with added NaOH followed by cautious acidification, racemizes the L isomer to the original DL racemate used as starting material.

(B) D - N - chloroacetyl - 2 - (p-hydroxyphenyl)glycine (IV).—A vigorously stirred suspension of 2.6 g. of the dehydroabietylamine salt (III) in 20 ml. of water and 50 ml. of methylene chloride was adjusted to pH 10.7 by the slow addition of 20% sodium hydroxide causing solution of the solid. The aqueous phase was separated, washed 3 times with methylene chloride, filtered and acidified to pH 2 with 6 N HCl. Scratching induced crystallization of the product in large clumps of fluffy crystals. After 1 hr. in the refrigerator the product was collected by filtration, washed sparingly with water and dried at 40°; 0.73 g. (61.2%), M.P. 193–196° dec., $[\alpha]_D^{24°}=-205.1°$ (C 1 95% EtOH). The IR and NMR spectra were fully consistent for the desired product.

*Analysis.*—Found (percent): C, 49.24; H, 4.19; N, 5.56. Calcd. for $C_{10}H_{10}ClNO_4$ (percent): C, 49.29; H, 4.14; N, 5.75.

The dehydroabietylamine may be recovered from the solvent phase above by evaporation of the solvent or salt formations.

In the alternative, the solvent-extracted aqueous phase containing IV can be acid hydrolyzed to V (to remove the N-chloroacetyl group as in the procedure below) directly without isolation of IV as a solid.

The aqueous filtrate was extracted 3 times with ethyl acetate. The combined and dried ($Na_2SO_4$) extracts were concentrated to dryness giving after drying in vacuo over phosphorus pentoxide 0.24 g. (20%) of crystalline product (IV); M.P. 189–190° dec., $[\alpha]_D^{24°}=-201.1°$ (C 1 95% EtOH).

D-2-(p-hydroxyphenyl)glycine (V).—A mixture of 1.19 g. of D-N-chloroacetyl-2-(p-hydroxyphenyl)glycine (IV), $[\alpha]_D^{24°}=-206.6°$, and 12 ml. of 2 N HCl was heated at reflux for 1.5 hrs. The mixture was concentrated to dryness. Water (5 ml.) was added to the residue and the soln. again concentrated to dryness leaving as residue, the crystalline hydrochloride salt of D-2-(p-hydroxyphenyl)glycine, M.P. 215–215° dec.

A solution of the residue in 10 ml. of water was adjusted to pH 4.5 with 20% sodium hydroxide. A gelatinous mass formed. The mixture was warmed to about 50° on the steam bath whereupon another crystalline (granular) form started to separate. The mixture was concentrated to approx. one-half of its initial volume. After 1 hr. at room temperature the flask was stored in the refrigerator overnight. The product was collected by filtration washed sparingly dropwise with ice water and dried in vacuo at 65° over phosphorus pentoxide; 0.61 g. (V) (81.3%), M.P. 223–226° dec., $[\alpha]_D^{24°}=-159.1°$ (C 1

N HCl), $[\alpha]_D^{24°} = -108.5°$ (C 1 H$_2$O). The IR and NMR spectra were fully consistent.

*Analysis.*—Found (percent): C, 57.56; H, 5.63; N, 8.38, Calcd. for C$_8$H$_9$NO$_3$ (percent): C, 57.48; H, 5.44; N, 8.38.

I claim:

1. Dehydroabietylammonium D-(—)-2 - chloroacetylamino-2-(p-hydroxyphenyl)-acetate.

2. The compound of claim 1 in a substantially pure, crystalline solid form.

References Cited

UNITED STATES PATENTS 3,454,626 7/1969 Gottstein _____ 260—501.1
3,479,339 11/1969 Holdrege _____ 260—239.1

LEON ZITVER, Primary Examiner

M. W. GLYNN, Assistant Examiner

U.S. Cl. X.R.

260—519